United States Patent
Gonske

[19]

[11] Patent Number: 6,148,839
[45] Date of Patent: Nov. 21, 2000

[54] APPARATUS AND METHOD FOR INJECTING LIQUID ADDITIVES INTO AGRICULTURAL AND INDUSTRIAL WATER SUPPLIES

[75] Inventor: Donald James Gonske, Redding, Calif.

[73] Assignee: Injection Systems, Inc., Redding, Calif.

[21] Appl. No.: 09/241,618

[22] Filed: Feb. 1, 1999

[51] Int. Cl.[7] .................................................. G05D 11/08
[52] U.S. Cl. .................................... 137/3; 137/9; 137/93; 137/101.19
[58] Field of Search ................................ 137/93, 101.19, 137/101.21, 3, 9

[56] References Cited

U.S. PATENT DOCUMENTS

| | | | |
|---|---|---|---|
| 4,073,304 | 2/1978 | Lerner et al. | 137/101.21 |
| 4,123,800 | 10/1978 | Mazzei . | |
| 4,273,146 | 6/1981 | Johnson | 137/5 |
| 4,917,304 | 4/1990 | Mazzei et al. . | |
| 4,945,939 | 8/1990 | Maxwell et al. | 137/93 |
| 5,135,174 | 8/1992 | Chaplinsky . | |
| 5,792,342 | 8/1998 | Heller et al. | 210/96.1 |

OTHER PUBLICATIONS

Turf Feeding System, Inc.; Micro Feeding Systems; advertising brochure; Houston, Texas; date unknown.
Dosmatic U.S.A./International; Dosmaticplus; advertising brochure; Lewisville, Texas; date unknown.
H.E. Anderson Company; Ratio:Feeder, The Anderson Injector; advertising brochure; Muskokee, Oklahoma; Aug., 1994.
ChemIndustrial Systems, Inc.; CSI, Almost Everything You Need To Know About CSI Injectors; advertising brochure; Cedarburg, Wisconsin; BR 02a00 Aug. 1994 gr/bl 50K.
Injection Systems.; The Accura–Treat System; advertising brochure; Redding, California; Feb. 1995.
Irrigation Injection Technologies; Once, your irrigation system was just for water . . . Things have changed.; advertising brochure; Yuma, Colorado; Bulletin 100 11t2/95.

*Primary Examiner*—Stephen Hepperle
*Attorney, Agent, or Firm*—R. Michael West; Boutin, Dentino, Gibson, Di Gusto, Hodell & West

[57] ABSTRACT

An apparatus and method for injecting a liquid product or chemical into a main water supply line used for agricultural or industrial purposes. A pressure regulating bypass valve has an inlet side connected to an outlet line of a multi-ganged, diaphragm pump. The pump is run at a constant speed and produces a non-pulsatile flow of product. The bypass line of the valve is connected to an inlet line of the pump. The bypass valve is set at a predetermined pressure, discharging any excess product into the bypass line. The product line at the outlet side of the bypass valve progresses in serial fashion to an electronic control valve, a product flow meter, and a check valve. The output side of the check valve is interconnected to the main water supply line for injection of product therein. A water flow meter is also provided in the main water supply line. A computerized controller samples flow rates within the water supply line and the product line, and manipulates the electronic control valve to effect various proportional or fixed injection rates for the product. The controller is programmed to carry out different predetermined modes of operation through a user-friendly menu driven system using a keypad for mode selection and data entry. The controller also logs all information pertaining to operational aspects of the injection system. A special mode is provided for calibrating the product flow meter to compensate for changes in product viscosity as a result of different product, temperatures, and concentrations.

20 Claims, 7 Drawing Sheets

APPARATUS AND METHOD FOR INJECTING LIQUID ADDITIVES INTO AGRICULTURAL AND INDUSTRIAL WATER SUPPLIES

BACKGROUND OF THE INVENTION

1. Field of the Invention

The invention relates generally to devices for introducing additives, such as chemical or other liquid amendments, into a water supply line. More specifically, the invention pertains to a computerized apparatus and associated methods which are effective to inject an accurately metered flow of acid, fertilizers, or other liquid product into the incoming flow of a main water supply line used for agricultural or industrial purposes.

2. Description of the Prior Art

Devices providing metering of chemicals or other liquid product into a water supply line used for irrigation or in industry are well known in the prior art. The earliest metering systems simply introduced a chemical into a main water supply line at a fixed, predetermined rate, irrespective of the volume of water actually passing through the supply line. Later, more sophisticated proportionate chemical injection systems were developed. These systems were configured having a selected chemical-to-total flow ratio, effective to deliver chemical(s) into a supply line in proportion to the total flow measured in that line. Other prior art systems were designed to apply a predetermined weight of fertilizer in an aqueous solution, to a known acreage of land, over a particular period of time. Still other systems meter acid into a monitored incoming water supply line, to maintain a predetermined Ph in the outflowing water.

Such prior art chemical injection systems typically use a piston pump or a single diaphragm product pump to inject a chemical into the supply line. Diaphragm pumps are more desirable for chemical injection because the diaphragm separates the chemical solution from the other mechanical components of the pump. Owing to this physical isolation of the pumping mechanism from the chemical solution, diaphragm pumps can reliably pump abrasive and corrosive liquids, fertilizers, and acids.

Prior art systems vary the speed of the diaphragm pump to inject the appropriate amount of liquid product into the line. Because single diaphragm pumps have a large diaphragm running at a relatively slow stroke rate, such as 100 strokes per minute, they produce a pulsatile flow in the liquid delivered. As a consequence of this pulsing, accurate measurement of the precise rate of product flow is difficult, if not impossible. In addition, different chemicals or even the same chemical in different concentrations and temperatures will change the viscosity of the metered product. Different viscosities of the chemical product also significantly affect the accuracy of any product flow meter used for flow measurement.

Heretofore, such systems were calibrated for proper flow rate by using a calibration tube and a stop watch. Through a process of trial and error, the stroke length of the diaphragm pump is manually adjusted to draw a volume of the calibration tube at a single target delivery rate. This method is manual, tedious, time consuming, and not accurate over a range of product delivery rates. Nor does this method of calibration offer the features of constant monitoring and regulation of product flow rate during actual chemical injection. And, lacking the ability to make real time accurate measurements of both main line and product line flow rates, prior art devices lack the ability to log system performance and operation.

Consequently, room exists for improvement in the accuracy and ease with which prior art systems measure, deliver, and log the delivery of chemical amendments to an agricultural irrigation system, or an industrial water system.

SUMMARY OF THE INVENTION

The present invention uses a programmable computer, designed to provide precise electronic control of the selective introduction of chemical product into the main line of a water supply system. Although the disclosure herein will emphasize certain landscaping and agricultural applications for the invention, the injection system of the present invention can be used advantageously for industrial applications as well.

The heart of the hydraulic portion of the system is a three-ganged, oil driven, diaphragm pump, running at a constant speed at all times. The inlet line to the pump is interconnected to a product storage tank. The outlet line of the pump is delivered seriatim through a pressure regulating bypass valve, an electronically controlled motorized valve, a product flow meter, and a check valve. The discharge of the check valve is thereafter injected into the main irrigation line.

The pressure regulating bypass valve in combination with the diaphragm pump provides several of the unique operational characteristics of the present invention. The bypass valve is set to discharge liquid product from the outlet line when a predetermined pressure is exceeded. Bypassed liquid is then reintroduced to the inlet of the diaphragm pump. Because the output of the pump preferably results in a liquid pressure which exceeds the predetermined pressure, a certain amount of liquid is thereby bypassed at all times. In this way, the chemical product delivered through the downstream electronic flow valve and then to the flow meter is delivered both pulse free and at a substantially constant pressure at all times.

The flow meter in the product line produces electronic pulses, corresponding directly and accurately to the rate of product flow. The computer receives those pulses, determines the instantaneous rate of flow, and stores the cumulative amount of product delivered into the main line water system.

Each product flow meter has a characteristic "K" factor, based upon the meter's response to water flowing at a standard calibration temperature. Upon initialization of the apparatus of the present invention, the "K" factor for the particular product flow meter installed is entered into the computer's memory. The "K" factor may subsequently be modified during a calibration process. For example, if the temperature, concentration, or type of the particular chemical used is changed, the "K" factor may have to be modified so that accurate product flow determinations are made by the computer.

A special calibration system disclosed herein allows the user to adjust the "K" factor, cumulatively taking into consideration the characteristics, the concentration, and the temperature of the additive chemical product.

First, a target calibration flow rate is entered into the controller. This target calibration flow rate is selected to be close or identical to a predicted product injection rate, for the application at hand. Then, the injection pump is started, and the control valve is adjusted by the controller, so the actual flow rate and the target calibration rate are identical.

The controller then calculates the precise amount of time the injection pump must pump, to pump a target volume. The target volume is arbitrary, but preferably selected to be a volume which is a significant portion of the total volume of a calibration cylinder.

The calibration system employs a three-way calibration valve in the product line between the product supply tank and the diaphragm pump. In the calibration mode, product is diverted from the product line by the calibration valve, and fed into the calibration cylinder. This cylinder includes increments of measure corresponding to the cylinder's volume. The cylinder is preferably gravity filled with product to a selected volume. This volume is entered into the controller's memory, as the calibration volume. Next, the calibration valve is turned to another position, where the inlet of the pump is hydraulically connected to the calibration cylinder.

Then, the injection pump is actuated by the controller, and product is drawn from the calibration tube, until the predetermined amount of time elapses. Then the injection pump is turned off by the controller. After the injection pump is turned off, the operator examines the calibration cylinder, and enters the value of the remaining volume, into the controller. The controller subtracts the remaining volume from the calibration volume to determine a pumped volume. The controller then compares the pumped volume to the target volume. If the pumped volume is either too high or too low with respect to the target volume, the "K" factor is adjusted accordingly. Then, when the injection pump is run, the measured volume and the pumped volume will be identical.

A Ph sensor may also be placed in the incoming main line, downstream from the product introduction point. The output of the sensor is fed to the computerized controller, which has been preprogrammed with a set point, or desired Ph. As with the other chemicals, the Ph adjusting product(s) is metered into the main line, in this case to change the Ph of the irrigation water to the set point. The calibration system, and the substantially constant pressure, pulse-free flow features of the present invention are thereby used to effect particularly accurate Ph maintenance of the irrigation water.

The computer also includes a menu of predetermined modes of operation. For example, the computer may be set to meter a certain weight of chemical product in an aqueous solution, to be delivered to a given area of land. In addition, the user may instruct the computer to deliver proportional parts per million of product to the total amount of irrigation water in gallons. Or, the user may set the computer to deliver a fixed, predetermined number of gallons per hour of product, irrespective of the flow rate of the main line. These and other objects of the present invention will become apparent in the detailed description and the accompanying drawings to follow.

DETAILED DESCRIPTION OF THE PREFERRED EMBODIMENT

Figure 1:
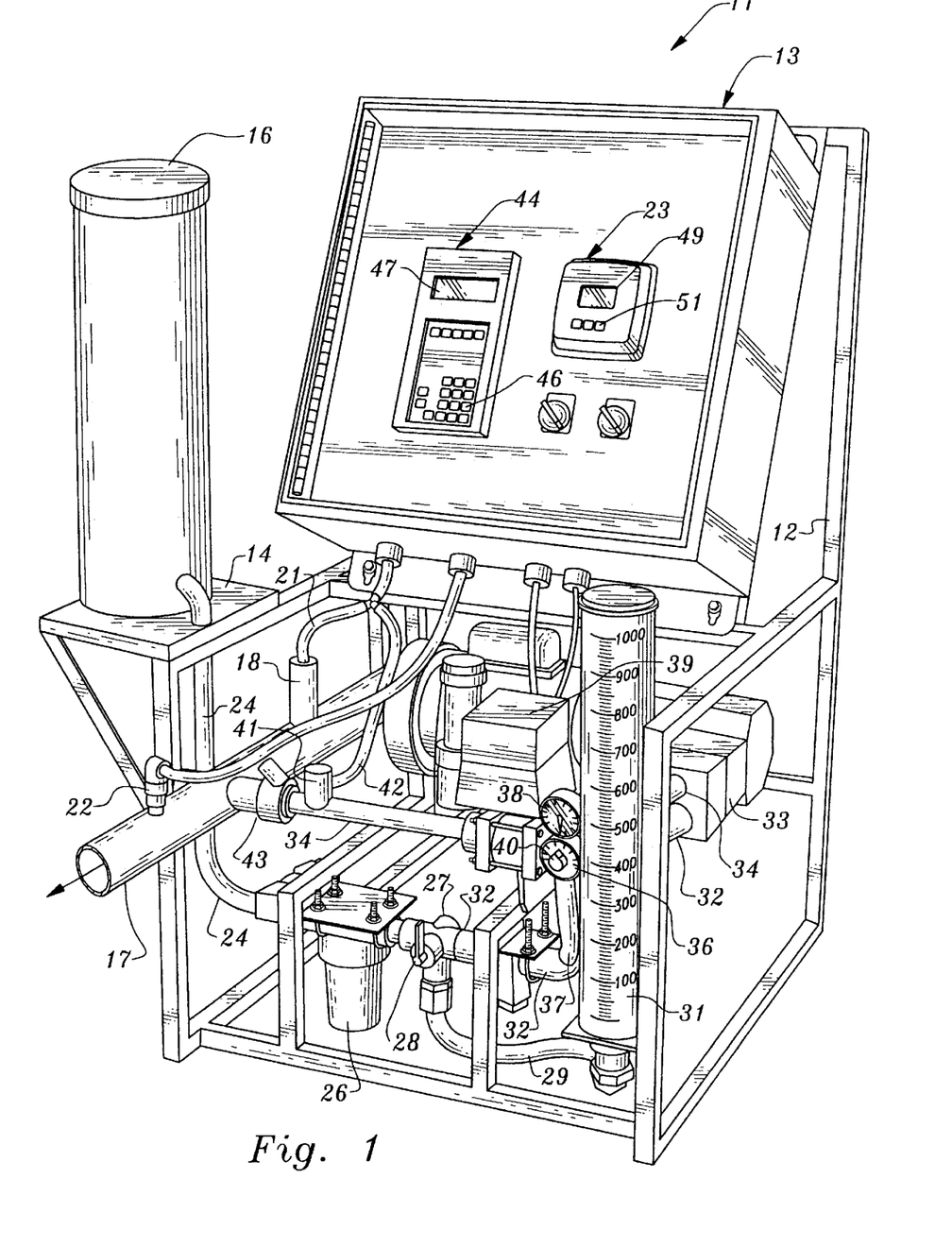
FIG. 1 is a perspective view of the chemical injection system of the present invention.

Turning now to FIG. 1, the liquid injection apparatus 11 of the present invention is shown. A tubular frame 12 is used to support and arrange the major components of the apparatus, so they are readily accessible for use and servicing. An inclined housing 13 is mounted on the frame 12, and typically includes a door (not shown) to provide a weathertight enclosure for a number of the electronic components to be described herein. The frame may include a small platform 14 to support a small product supply tank 16, at the site. Alternatively, the supply tank may be sized considerably larger, and located at a location remote from the apparatus. The liquid product stored in tank 16 may be: an acid; a fertilizer, such as nitrogen in an aqueous solution; or, any other liquid amendment to be metered into a main water line 17. Line 17 typically passes adjacent or through the apparatus to facilitate electrical and hydraulic interconnections therewith.

A main line flow meter 18 is included in line 17 for measuring the instantaneous rate of flow of water through the main line. Meter 18 produces electronic pulses in response to water passing therethrough. These pulses are delivered to an input of a computerized controller 19 through a first meter line 21. Controller 19 is enclosed within housing 13, for protection from weather and tampering by unauthorized persons. Controller 19 includes a microprocessor, programmable memory, and input and output modules. The modules which read the flow meter pulses are high speed counters which count every pulse and communicate that data to the microprocessor for display and storage routing. The controller is programmed with algorithms based upon various proportional, integral, and derivative functions. The calculations performed by the controller using these algorithms allow the controller to anticipate the correct speed and target settings for making product flow adjustments before actual inputs verify the corrections. In this way, overshooting the target settings is avoided.

For those applications which require Ph balance of the irrigation water, a Ph sensor 22 is also provided in line 17. The output of sensor 22 is fed to a digital Ph transmitter 23, which delivers an amplified output to another input of controller 19. The disclosure herein teaches a reduction in the Ph of the incoming water effected by adding an acid in metered amounts to the main flow. In the event circumstances require, the same apparatus could be used to raise the Ph through the injection of an appropriate chemical having a relatively high Ph.

None of the above-identified components is particularly critical. A satisfactory main line flow meter 18 is manufactured by a number of companies, including Data Industrial, Inc., Sea Metrics, Inc., and Signet Scientific Co. A computerized controller 19 which has been used with success in practicing the invention is a Model #LCSX-Plus-Controller, using a "Snap-B-3000 Brain Board," manufactured by Opto 22, of Temecula, Calif. A suitable Ph transmitter 23 is a Model #3-8710, produced by Signet Scientific Company of El Monte, Calif. Persons of ordinary skill in the art will readily find these products commercially available, or they may substitute equivalent components and successfully practice the invention.

Figure 2A:
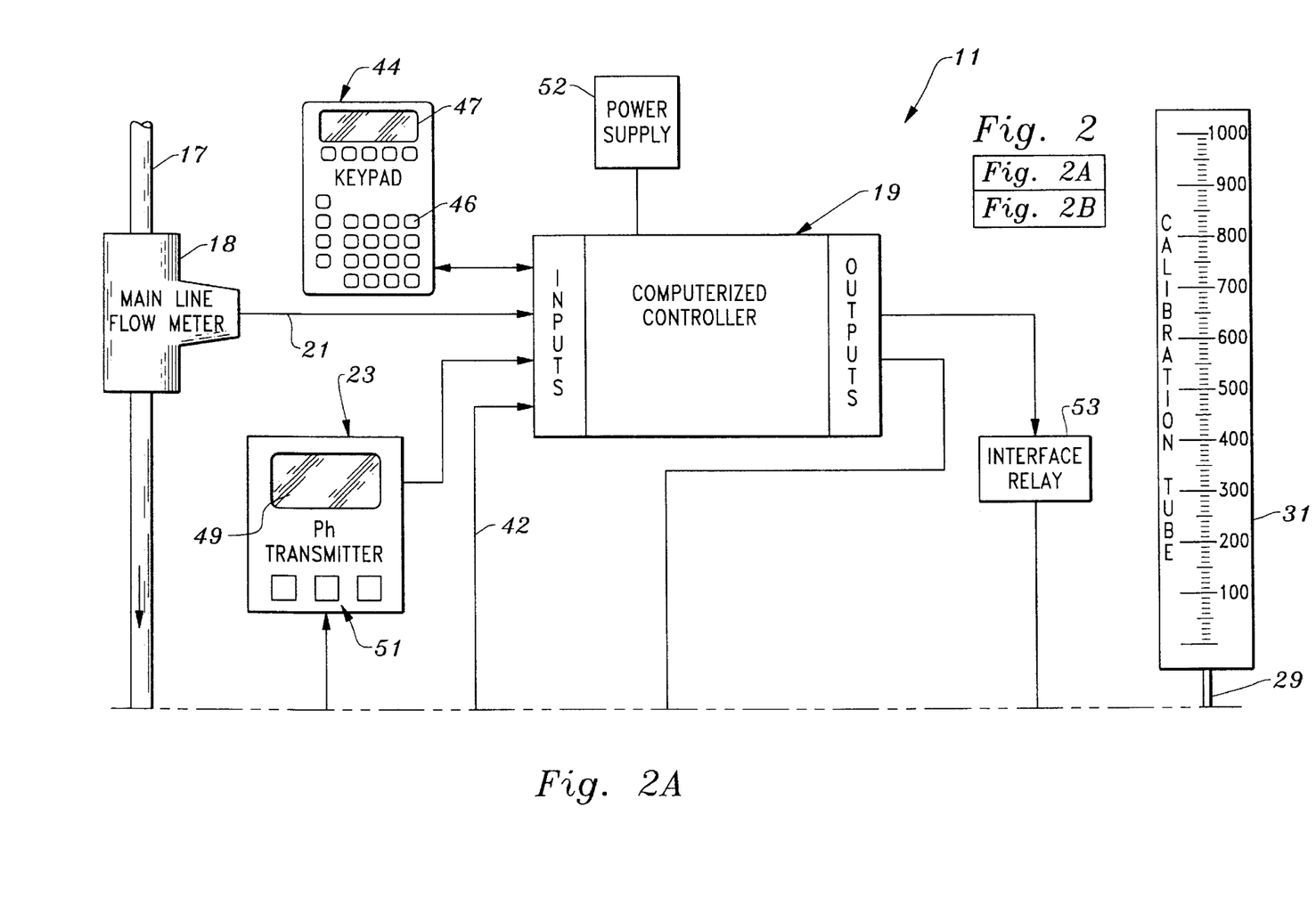
FIGS. 2A and 2B constitute an electro-hydraulic schematic of the system.
Figure 2B:
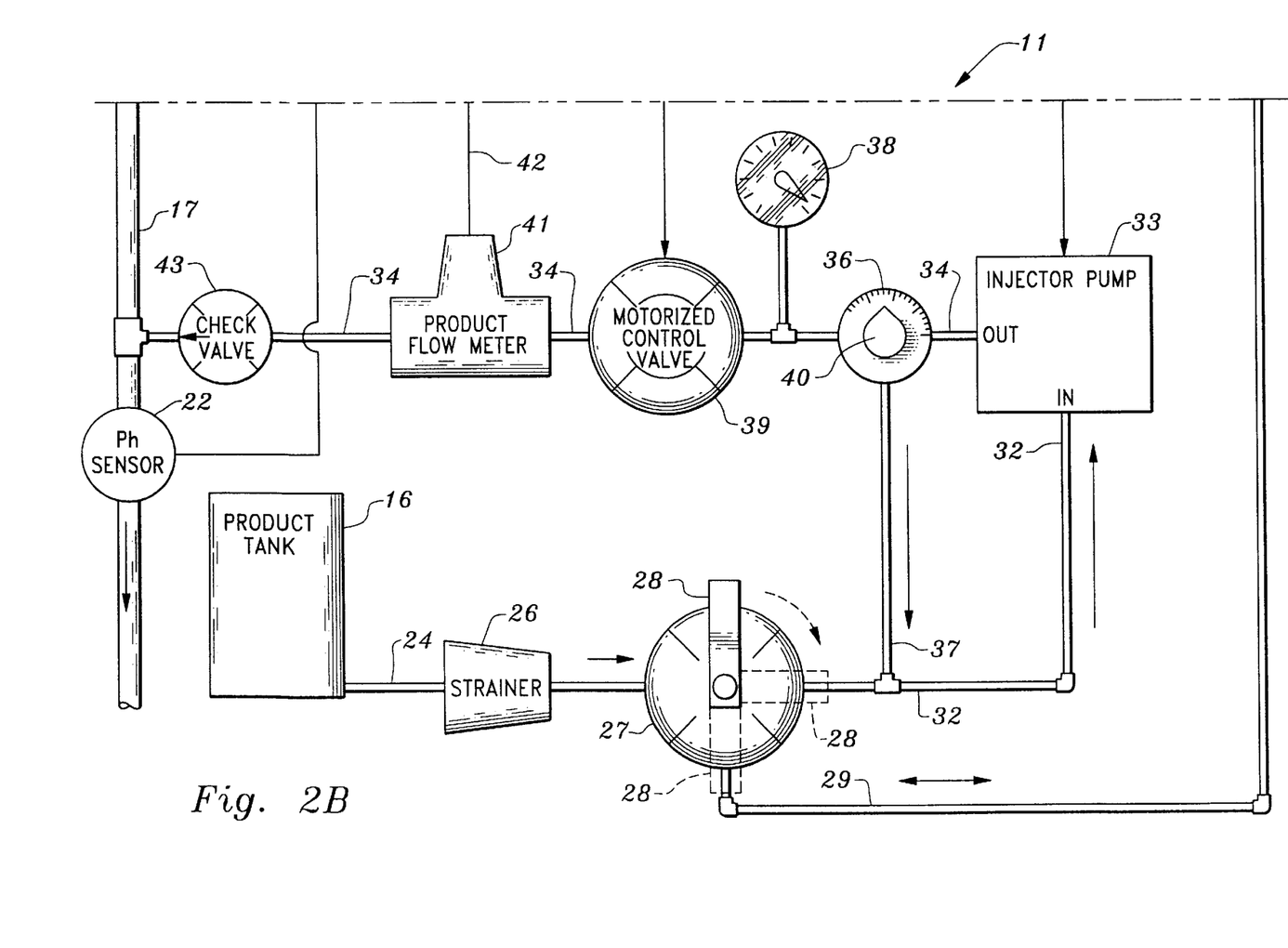

A drain line 24 delivers liquid product from tank 16 to a strainer 26. Any debris or other particulate material which might foul downstream components is removed from the product stream by strainer 26. The outlet of strainer 26 is fed into a three-position calibration valve 27. A lever 28, extending from the side of valve 27, has three operative positions. In an upwardly pointing, 12 o'clock calibration fill position, as shown in FIGS. 1 and 2B, the valve directs product from line 24 into a diversion line 29. Product is thereby fed by gravity, from tank 16 into a graduated calibration tube or cylinder 31. By turning the lever clockwise, to a 3 o'clock product injection position, product is allowed to flow from line 24 directly through to a pump inlet line 32. And lastly, by turning the lever further clockwise, to a 6 o'clock position, product is allowed to flow into a calibration run position. These three positions are shown respectively in full and broken line, in FIG. 2B.

A three-diaphragm injector pump 33 includes an inlet connected to inlet line 32, and an outlet connected to an outlet line 34. Pump 33 is commercially available, and is known as a Hydra-Cell Model M03, distributed by Wanner Engineering, Inc. of Minneapolis, Minn. Although other pumps will work in the present application, the three-staggered diaphragm design of this Hydra-Cell product has proven particularly advantageous.

In general, a diaphragm pump design was selected to provide reliability and longevity in the injection pump's operation. Because only the diaphragm comes into contact with corrosive or abrasive elements, the other moving parts of the pump are isolated from the deleterious effects of exposure to these elements. More specifically, a three diaphragm pump 33, in which the diaphragms are operationally staggered, was chosen for apparatus 11. This selection was made owing to the smooth, non-pulsatile flow of product which such a pump provides. As opposed to single diaphragm pumps which inherently pulse the pumped product, a three diaphragm pump provides a smooth pumping action, resulting in a substantially constant flow for the pumped liquid. The advantage of such a smooth flow is that it allows measurements of product flow to be made not only during meter calibration, but also during actual use of the injection apparatus.

Interposed within the outlet line 34 is a pressure regulating bypass valve 36. Tequom Industries, of Santa Ana, Calif., manufactures such a valve, which is designated as a model #PV-RV8-8P-150. This particular model has proven suitable for the valve 36 used in the present application, although other equivalent valves or methods of providing pressure regulation would work as well. A bypass, or discharge outlet, of valve 36 is connected to a by-pass line 37, returning bypassed product to inlet line 32. In operation of the apparatus, pump 33 runs continuously. Bypass valve 36 is set by adjusting a knob 40 to maintain a pre-determined pressure, continuously monitored by a pressure gauge 38. In the event the pre-determined pressure is exceeded, valve 36 discharges excess product through line 37, where it returns to the inlet of the pump. In this manner, smooth product flow at a constant pressure is effected through outlet line 34.

An electrically actuated product control valve 39 is also located in line 34, downstream from valve 36. This motorized control valve is bi-directional in operation, driven by digital output modules in the controller 19, to determine the amount of product being injected into the main line. As will be explained more fully below, the controller 19 uses the data inputted by the operator, the measured main line flow rate, and the existing product flow rate to decide whether and how much to open or close control valve 39.

Preferably, valve 39 has a smooth and linear control over the rate of product flow through line 34. Spraying Systems Co. of Wheaton, Ill., manufactures an electronic ball valve, Model #46447-344RE, which has been used to practice the invention, with a small modification. Unmodified, the maximum flow rate through the valve is approximately 13 GPM. However, most applications for product injection require a considerably smaller rate of flow, on the order of 0.065 to 3 GPM, or so. To effect a usable range of flow rates yet retain the smooth operation inherent in this ball valve, opposing lateral grooves in the sidewall of the ball, through which fluid is allowed to flow, were custom manufactured shallower and narrower than in the stock product. Although this modification to an existing product has proven effective, other equivalent valves will work as well. The principal objective of operation of valve 39 is to effect a smooth and linear control of increasing and decreasing usable flow through the valve, in response to the control of an electrical signal. Those of ordinary skill in the art will readily be able to practice the invention by using the suggested commercial product, or an equivalent valve.

Downstream from control valve 39 is a product flow meter 41. Another commercially available product, manufactured by Hoffer Flow Controls, Inc. of Elizabeth City, N.C., is suitable for use as a product flow meter in the present invention. This product is designated as a Model #H01-½×¼-0.0625-3 (RPRS15)-NPT. Meter 41 is designed to produce electronic pulses as an output, in proportion to the flow of product through the meter. This output is fed through a second meter line 42 to an input of controller 19.

Lastly, a downstream check valve 43 is placed within line 34, having a discharge end connected to main supply line 17. This check valve is included to prevent the unwanted migration of supply water into the chemical injection system, if the main line water pressure is greater than the pressure within line 34, for whatever reason.

Part of the operator-user interface is provided by a keypad 44, including keys 46 and a visual display 47. Some of the keys are numeric, while others are specially marked function keys, corresponding, for example, to modes of operation for the injection apparatus. Typically, display 47 is made using liquid crystals, although light emitting diodes or other visual indicators may be used as well. Display 47 indicates the status of operation of the apparatus, displays selection options for modes of operation, shows the values of existing and new user-entered variables, and the flow rates for both the main water and the product lines. The Ph transmitter 23 provides the remainder of the user interface. A digital visual display 49, preferably liquid crystal in construction, is provided on the front panel of transmitter 23. Display 49 constantly indicates the Ph of the water in the main line, downstream from the product injection point. This information is also transmitted to an input of controller 19. Also included on the front panel of the transmitter are selection buttons 51. By immersing sensor 22 in a reference Ph solution and manipulating buttons 51, the user may re-calibrate the transmitter so that the measured Ph in the main water line is accurate.

Additional electronic components are connected to controller 19, although some of them are not evident in FIG. 1. For example, a power supply 52, enclosed within housing 13, provides the necessary direct current voltages to the controller 19 (see, FIG. 2A). Because the output of the controller is only low voltage direct current, an interface relay 53, also within housing 13, is provided to switch either 110 or 220 volt alternating current to power the motor for injection pump 33. It should also be noted that the controller 19 can communicate all system data by way of a modem interface with a telephone line or a radio communication system to a host computer in a remote location. Also, controller 19 may be provided with multiple pump controls, so that a plurality of pumps, chemicals, and injection system components may be independently programmed in different chemical application modes, at the same or at remote locations.

Having presented a description of the basic components of the apparatus, we can now turn to an explanation of their practical use in a number of specific applications and modes of operation.

Figure 3:
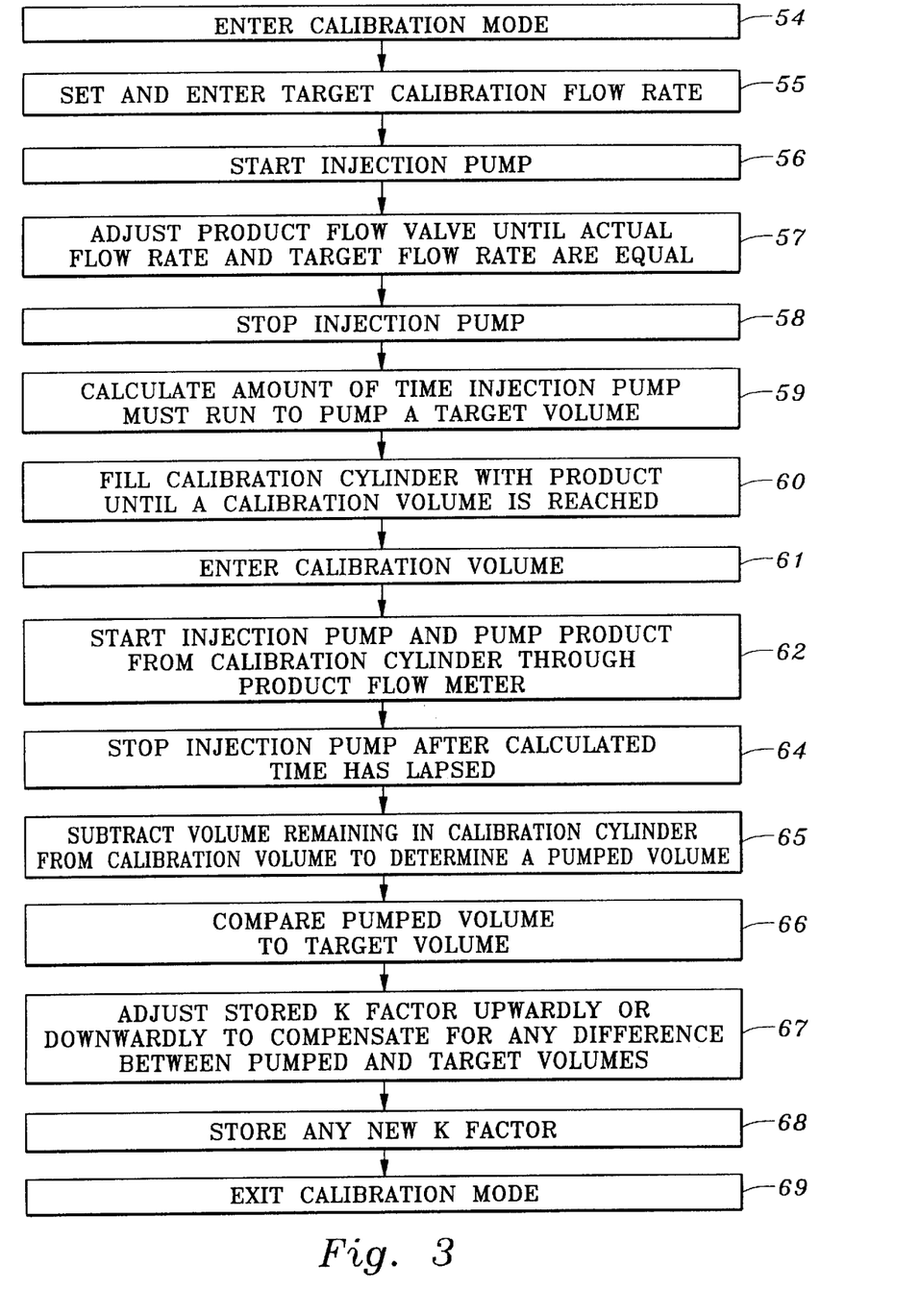
FIG. 3 is a flow chart, showing the process for carrying out the calibration procedure.

A preliminary step to using the apparatus is completion of the meter calibration procedure, set forth in flow chart form in FIG. 3. Both of the flow meters of the present invention are calibrated at the factory for use with a liquid having the specific gravity of water. Each meter has a characteristic "K" factor, which corresponds to the number of electrical pulses produced by that meter, for the passage of one gallon of liquid. This "K" factor will change, to the extent product viscosity and specific gravity change from the water used for the factory calibration. The main line flow meter 18 does not need site calibration by the operator of the apparatus 11, as the incoming fluid is water. However, as different chemical products to be injected may have different viscosities, the product flow meter 41 should be site calibrated for each different product used.

During the calibration procedure, test parameter data is initially inputted to the controller 19. Then, following a test pumping run using the subject product, the "K" factor is appropriately adjusted and a new "K" factor value is stored. Upon entering the calibration mode in step 54, the operator sets and enters a target calibration flow rate (step 55), for the product injection system. The target calibration flow rate is selected to be within the range of expected flow rates or identical to an expected flow rate, for the particular product application. This will insure the highest degree of accuracy in calibrating the product flow meter.

Carrying out step 56, the controller 19 automatically starts the product injection pump 31. In Step 57, the controller adjusts the product flow valve 39 until the actual flow rate measured by meter 41 and the target calibration flow rate are equal. Then, the controller stops the injection pump (step 58).

The controller 19 then calculates a certain amount of time the injection pump must run, to pump a target volume (step 59). The target volume is arbitrary, but in this case has been selected as 800 ml. This volume was chosen as it represents a significant portion of the total volume of the calibration cylinder.

In undertaking step 60, the operator turns lever 28 of calibration valve 27 to a 12 o'clock position (the fill position), and product is directed from product line drain 24 into diversion line 29. By gravity, product flows into calibration cylinder 31. The cylinder 31 is then filled with product until a selected calibration volume, typically 1,000 ml, is reached. By entering the selected calibration volume into the keypad 44, step 61 is completed. Before undertaking the next step, lever 28 is turned to the 6 o'clock calibration position, in which the cylinder 31 is hydraulically connected to inlet line 32 of the injection pump.

In step 62, the injection pump is started, and product is pumped from the calibration cylinder through the flow meter 41. In step 64, the pump stops automatically, after the calculated amount of run time has elapsed.

After the pump has stopped, the operator inspects the calibration cylinder, and determines the volume of product remaining in the calibration cylinder. The value of the remaining volume, which should be approximately 200 ml, or so, is entered into the controller via keypad 44. The controller then subtracts the remaining volume from the calibration volume, to determine a pumped volume (step 65). This volume corresponds to the actual amount of product pumped from the calibration cylinder, during the calibration process.

The controller 19 then compares the pumped volume to the target volume (step 66), and adjusts the stored "K" factor upwardly or downwardly to compensate for any differences between the pumped volume and the target volume (step 67). In the event that a new "K" factor results, this new factor is stored in the memory of the controller (step 68), for subsequent use during the product injection process. In step 69, the operator exits the calibration mode, and the apparatus 11 is ready to be programmed to run in a selected mode of operation.

These modes will be explained in the following examples, making reference to the corresponding flow charts included in FIGS. 4–8. In presenting these examples, reference may also be made to the following variables, units of measure, and terms:

1. Total area to be irrigated is a variable, measured in acres, square feet, hectares, or square meters;
2. Rate of Nitrogen ("N") application is a variable, made the subject of industry standards depending upon specific applications, measured in pounds applied per month, per 1,000 square feet of total area to be fertilized;
3. Number of applications per month is a variable;
4. Total gallons of water per application is a variable, measured in gallons;
5. High station flow is a variable, measured in gallons or liters per minute;
6. Solution of N is a variable, measured in percentage;
7. Solution weight of N is a variable, measured in pounds.

EXAMPLE 1

Figure 4:
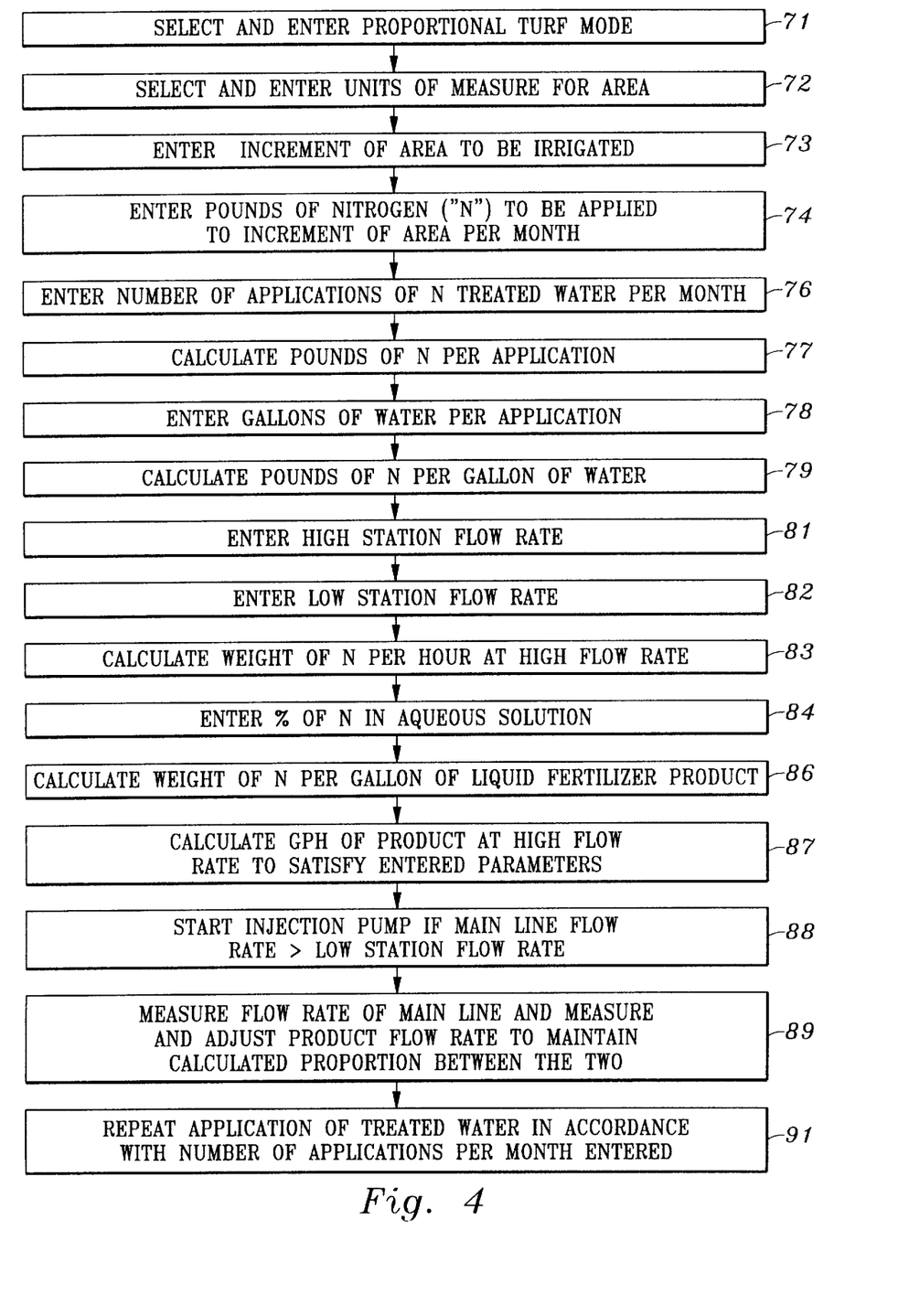
FIG. 4 is a flow chart showing the process for carrying out the proportional turf mode.

Proportional Turf Application (FIG. 4)

The proportional turf application program would be used for golf courses, parks, and other maintained grassy areas. It is based upon a generally accepted industry standard of 1 pound of Nitrogen to be applied to each 1,000 square feet of turf area, for each month. The information to be entered into the control computer to calculate and set the proportional rate of fertilizer to be applied, and to maintain the same ratio of fertilizer to irrigation supply water, is as follows:

A. Selection of Mode; Entry of Data; Calculation of Injection Rate of Nitrogen in 20% Aqueous Solution; (FIG. 4, steps 71–87)

1. Area=15 acres (step 72)×43,560 sq. ft/acre=653,400 sq. ft. (step 73);
2. (Assuming rate of Nitrogen application per industry standard for "Turf" is 1 lb./1,000 sq. ft), 653,400 square feet×1 pound/1,000 square feet=653.4 pounds (step 74);
3. Number of applications of N per month=15 (step 76);
4. 653 lbs. of N/15 applications=43.53 lbs. of N per application (step 77);
5. Supply flow of irrigation water=40,000 gallons per day (step 78);
6. 43.53 lbs. of N/40,000 gallons=0.001088 lbs. N per gallon of water (step 79);

7. High Station water flow=200 GPM (step 81);
8. Low Station water flow=10 GPM (step 82);
9. 200 GPM×0.001088 lbs./gallon=0.2176 lbs. of N/minute×60 min/hr.=13.056 lbs. of N/hr.(step 83);
10. Aqueous solution of N=20% N (step 84);
11. Assuming weight of 1 gallon of product solution=10 lbs., then 10 lbs. ×20% solution=2 lbs. of N/gallon (step 86);
12. 13.056 lbs./hr./2 lbs./gallon=6.53 gallons of 20% aqueous solution of N per hour (step 87);

B. Carrying Out Injection of Nitrogen (FIG. 4, steps 88–91)
1. Start injection pump, if flow rate in main line is greater than 10 GPM (step 88);
2. Measure flow rate of main line, measure flow rate of product line, and adjust product flow rate, if necessary, by sending electronic pulses to product control valve to maintain the proper proportion between the two based upon previously calculated proportion (step 89);
3. Repeat application of N treated solution in accordance with number of applications per month previously entered. (step 91).

EXAMPLE 2

Figure 5:
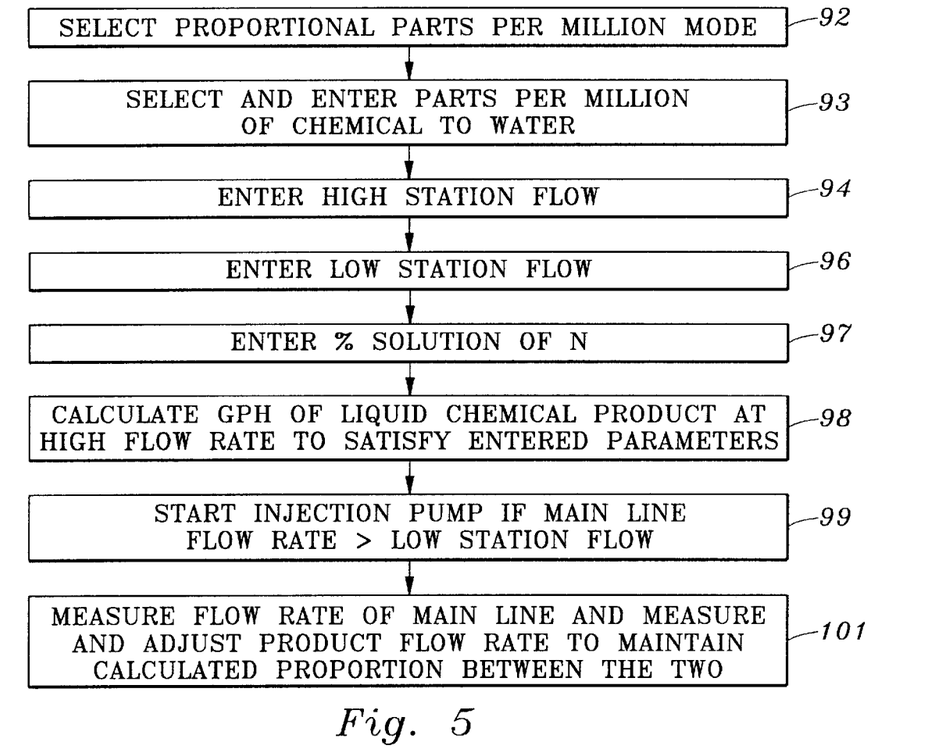
FIG. 5 is a flow chart showing the process for carrying out the proportional parts per million mode.

Proportional Parts Per Million (FIG. 5)

This program is similar to the proportional agricultural program, described below, except that it takes into consideration the percentage of Nitrogen in the product solution. The Proportional Parts Per Million (PPM) ratio is the true unit value of the material being delivered in proportion to the changing flow in the main water supply line. This mode of operation is commonly used in water treatment and industrial applications.

A. Selection of Mode; Entry of Data; Calculate Flow Rate of Liquid Chemical Product at High Flow Rate (FIG. 5, steps 92–98)
1. Select and enter 300 parts per million (PPM) of chemical to water supply (step 93);
2. Enter High Station Flow rate of 1,000 GPM, for main line water supply (step 94);
3. Enter Low Station Flow rate of 100 GPM, for main line water supply (step 96);
4. Enter 20% solution of Nitrogen (step 97);
5. 1,000 GPM×300 PPM=(0.3 gallons of 100% solution/minute)÷[0.2 (for 20% solution)]=(1.5 gallons of 20% solution per minute)×(60 minutes/hour)=90 GPH of 20% solution (step 98).

B. Carrying Out Injection of Chemical Solution (FIG. 5, steps 99–101).
1. Start injection pump, if main line flow rate is greater than 100 GPM (step 99);
2. Measure flow rate of main line, measure product flow rate, and adjust product flow rate to maintain calculated proportion between flow rates (step 101).

EXAMPLE 3

Figure 6:
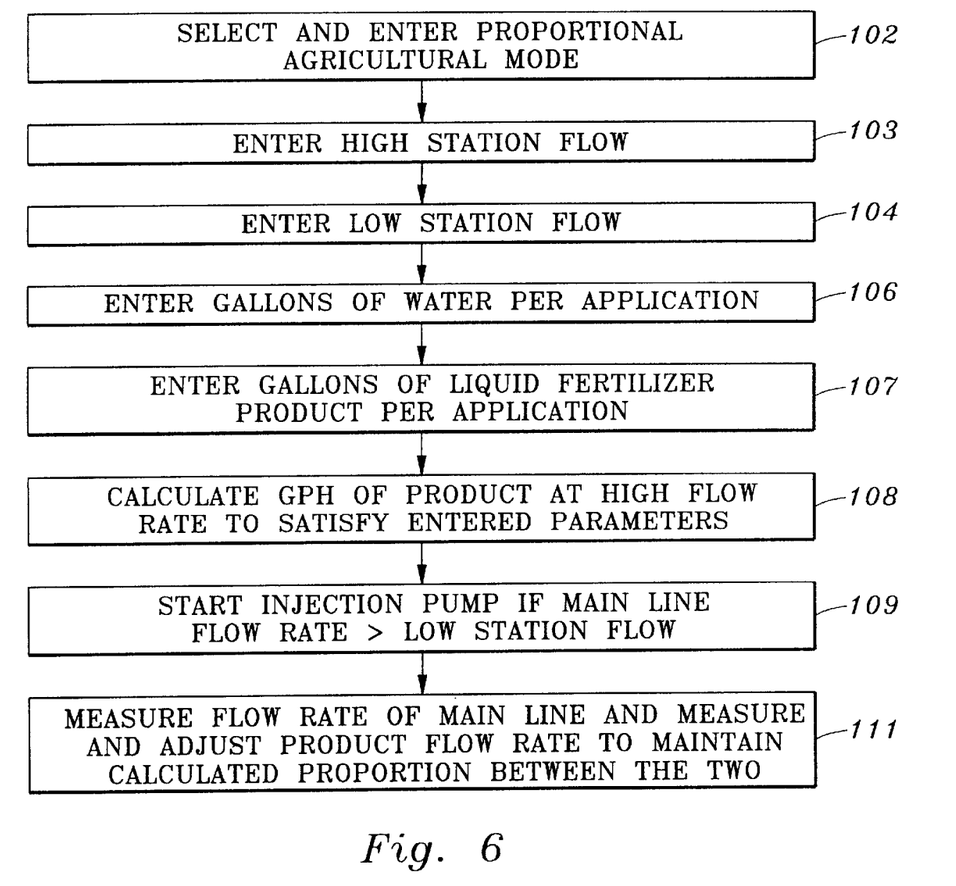
FIG. 6 is a flow chart showing the process for carrying out the proportional agricultural mode.

Proportional Agricultural Mode (FIG. 6)

The Proportional Agricultural Mode is a simple proportional program used in the agricultural industry. The two known variables are the total gallons of irrigation water per day and the total gallons of fertilizer injected into the irrigation flow. Fertilizer gallons divided by total water gallons provides a ratio of fertilizer to water. The controller 19 calculates and maintains this product injection ratio irrespective of any changes in the main water line flow rate.

A. Selection of Mode; Entry of Data; Calculation of GPH of Product (FIG. 6, steps 102–108)
1. Enter 1,200 GPM as High Station Flow rate (step 103);
2. Enter 100 GPM as Low Station Flow rate (step) 104);
3. Enter 1,440,000 gallons as the number of gallons of water per application (step 106);
4. Enter 2,700 gallons as the number of gallons of liquid fertilizer per application (step 107),
5. (2,700 gallons of fertilizer/application)÷(1,440,000 gallons of water/application)=(0.001875 ratio×1,200 GPM)×(60 minutes/hour)=135 GPH of fertilizer at High Flow Rate (step 108).

B. Carrying Out Injection of Chemical Solution (FIG. 6, steps 109–111)
1. Start injection pump, if main line flow rate is greater than 100 GPM (step 109);
2. Measure flow rate of main line, measure product flow rate, and adjust product flow rate to maintain calculated proportion between flow rates (step 111).

EXAMPLE 4

Figure 7:
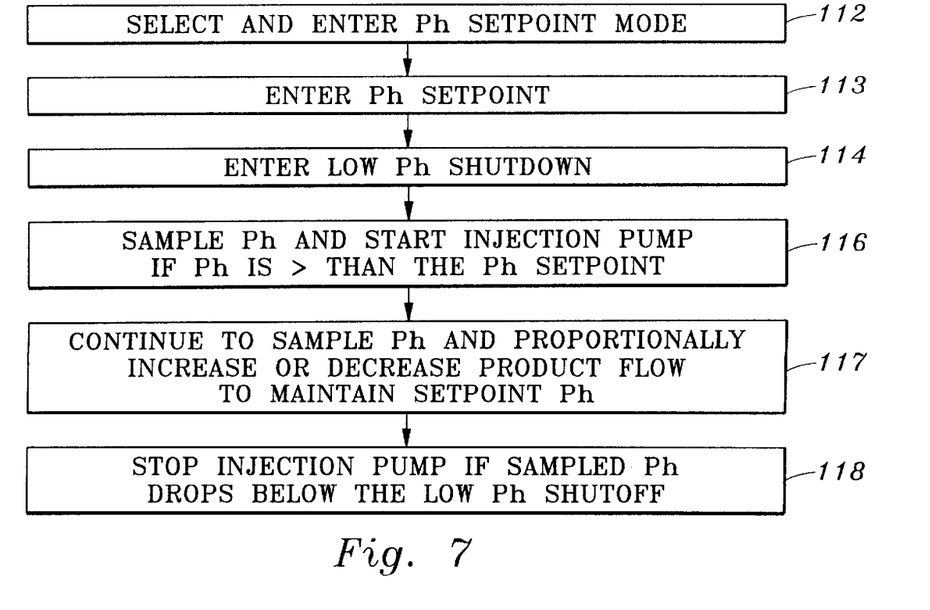
FIG. 7 is a flow chart showing the process for carrying out the Ph setup mode; and, FIG. 8 is a flow chart showing the process for carrying out the fixed rate mode.

Proportional Ph Mode (FIG. 7)

This program allows the user to maintain a set point for the Ph of the main water supply line. This is accomplished by installing a Ph sensor 22 in the main line, and interconnecting it to a Ph transmitter 23. The output of the transmitter is fed to an input of controller 19. The controller compares the measured Ph to a set point Ph, and increases or decreases the amount of product, typically an acid, being injected into the main supply line to maintain the set point value in responses to changes in the Ph of the main water supply line.

A. Selection of Mode, Entry of Data; (FIG. 7, steps 112–114)
1. Enter a target Ph set point of 6.8 (step 113);
2. Enter a low Ph shutdown of 4.5 (step 114);

B. Carrying Out Injection Of Chemical Solution (FIG. 7, steps 116–118)
1. Sample Ph sensor and start injection pump, if the Ph of the main line water is greater than the Ph of the set point (step 116);
2. Continue to sample the Ph sensor and proportionally increase or decrease flow of product to maintain set point Ph (step 117);
3. Stop injection pump, if the sampled Ph of the main line drops below the low Ph shutoff (step 118).

EXAMPLE 5

Figure 8:
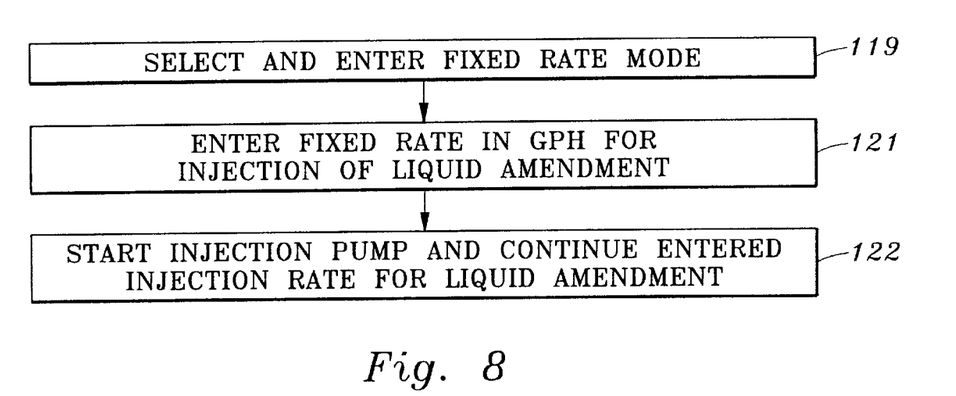

Fixed Rate Mode (FIG. 8)

This program allows the user to inject product into the main line water supply, at a fixed, predetermined rate. This mode will be useful where the line flow is substantially constant or not otherwise of concern, and the desired rate at which the liquid amendment is to be added is a known constant.

A. Selection of Mode; Entry of Data; (FIG. 8. steps 119–121)
1. Enter a 60 GPH as rate for the injection of liquid amendment (step 121);

B. Carrying Out Injection of Liquid Amendment (FIG. 8, step 122)

1. Start injection pump and continue entered injection rate for liquid amendment until escape command is entered (step 122).

Although these particular modes of chemical injection are commonly used for agricultural and industrial uses, those of ordinary skill in the art will recognize that the apparatus and method herein can be advantageously used to implement other modes of operation as well.

It will be appreciated, then, that I have disclosed an improved apparatus and a method for injecting liquid product into water supply lines, in which continual flow measurements are made of both the main water line and the product line, and adjustments are made to inject the correct predetermined amounts or proportions of product irrespective of changes in flow rate of the water supply.

What is claimed is:

1. An apparatus for injecting a liquid chemical product into a main line water supply, comprising:
   a. a supply of liquid chemical product;
   b. a product injection pump having an inlet line connected to said supply of chemical product, and a product outlet line, said injection pump producing a pulse free outlet flow of the chemical product;
   c. a pressure regulating bypass valve interposed in said product outlet line, having an excess pressure bypass line interconnected to said inlet line;
   d. a continuously variable, electrically actuated control valve, interposed in said product outlet line downstream from said bypass valve;
   e. a product flow meter interposed in said product outlet line downstream from said control valve, said product outlet line thereafter being fed into the main line water supply at an injection point;
   f. a main line flow meter interposed in the main line water supply; and,
   g. a computerized controller, having an output connected to said control valve, a first input connected to said main line flow meter, and a second input connected to said product flow meter, said controller varying said control valve in response to an output of said main line flow meter and an output of said product flow meter.

2. An apparatus as in claim 1 in which said controller increases or decreases the rate of flow of product through said product outlet line in proportion to changes in a metered flow rate of water through the main line.

3. An apparatus as in claim 2 including a check valve in said product outlet line, between said product flow meter and the main line water supply.

4. An apparatus as in claim 1 including a Ph sensor in the main line water supply downstream from said injection point, said sensor being connected to an input of said controller.

5. An apparatus as in claim 1 in which said controller is programmable with a Ph set point value, and in which said controller increases or decreases the rate of flow of product through the product line to maintain the Ph set point value.

6. An apparatus as in claim 5 further including a calibration valve in said inlet line between said pump and said supply, said calibration valve having a first position in which product is diverted from said inlet line into a calibration cylinder for filling said cylinder with a calibration volume of product, a second position in which product is routed from said cylinder into an inlet of said pump, and a third position in which product is allowed to flow directly from said product tank to said inlet of said pump.

7. An apparatus as in claim 1 in which said calibration valve is turned to said second position after said calibration cylinder is filled with said calibration volume, and in which said controller runs said pump for an amount of time calculated for the pump to pump a target volume, and in which a volume of product remaining in said cylinder after said pump is run is subtracted from said calibration volume to determine a pumped volume, said controller then comparing said pumped volume with said target volume and adjusting the calibration of said flow meter so that the pumped volume and a corresponding volume measured by said flow meter are equal.

8. An apparatus for injecting a liquid chemical product into a main line water supply, comprising:
   a. a supply of liquid chemical product;
   b. pumping means having an inlet line connected to said supply of chemical product and a product outlet line, said pumping means producing a substantially non-pulsatile flow of liquid chemical product at a predetermined pressure through said outlet line;
   c. a continuously variable, electrically actuated control valve, interposed in said product outlet line downstream from said pumping means;
   d. a product flow meter interposed in said product outlet line downstream from said control valve, said product outlet line being connected to the main line water supply at an injection point downstream from said product flow meter;
   e. a main line flow meter interposed in the main line water supply; and,
   f. a computerized controller, having an output connected to said control valve, a first input connected to said main line flow meter, and a second input connected to said product flow meter, said controller varying said control valve in response to an output of said main line flow meter and an output of said product flow meter.

9. An apparatus as in claim 8 in which said pumping means comprises a diaphragm pump and a pressure regulating bypass valve, said bypass valve being interposed in said outlet line between said pump and said control valve, and further including an excess pressure bypass line connected to said inlet line.

10. An apparatus for injecting a liquid product into an irrigation water supply line, comprising:
    a. a water flow meter in the water supply line;
    b. a supply of liquid product;
    c. a product pump having an inlet line connected to said supply of liquid product, and a product outlet line, said product pump producing a pulse free outlet flow of liquid product;
    d. a pressure regulating bypass valve interposed in said product outlet line, having an excess pressure bypass line interconnected to said inlet line;
    e. a continuously variable, electrically actuated control valve, interposed in said product outlet line downstream from said bypass line;
    f. a product flow meter interposed in said product outlet line downstream from said control valve, said product outlet line being fed into the water supply line at an injection point, downstream from said product flow meter; and,
    g. a computerized controller, interconnected to said water flow meter, said control valve, and said product flow meter, said controller varying said control valve in response to outputs of said water flow meter and said product flow meter.

11. An apparatus as in claim 10 in which the product flow is to be injected into the water flow in accordance with a predetermined proportion, and in which said proportion is entered into said controller as a reference for varying said control valve.

12. An apparatus as in claim 11 in which said product pump is a diaphragm pump, running at a constant speed.

13. An apparatus as in claim 12 in which said diaphragm is of multiple stages, which are staggered to produce said pulse free flow of product.

14. An apparatus as in claim 13 including a Ph sensor in the water supply line downstream from said injection point, said sensor being connected to an input of said controller.

15. An apparatus as in claim 11 in which said controller is programmable with a Ph set point value, and in which said controller increases or decreases the rate of flow of product through the product line to maintain the Ph set point value.

16. An apparatus as in claim 15 in which the product flow is to be injected into the water flow in accordance with a predetermined fixed rate, and in which said fixed rate is entered into said controller as a reference for varying said control valve.

17. A method for injecting a liquid chemical amendment into a main line water supply, comprising the steps of:
   a. measuring the rate of water flow in the main line;
   b. providing a source of liquid chemical amendment;
   c. pumping the liquid chemical amendment through a product outlet line with a substantially non-pulsatile flow and at a substantially constant pressure;
   d. measuring the rate of flow in the product outlet line;
   e. comparing the rate of product flow in the product line to the water flow in the main line, and determining a measured product to water proportion;
   f. comparing said measured product to water proportion to a predetermined proportion; and,
   g. adjusting the rate of flow in the product outlet line upwardly or downwardly by freeing or restricting product flow so that said measured product to water proportion and said predetermined proportion are equal.

18. A method for injecting a liquid chemical amendment into an irrigation water supply line at a predetermined fixed rate, comprising the steps of:
   a. providing a source of liquid chemical amendment;
   b. pumping the liquid chemical amendment through a product outlet line with a substantially non-pulsatile flow and at a substantially constant pressure;
   c. measuring the rate of flow in the product outlet line;
   d. comparing said rate of flow in the product outlet line to a predetermined value;
   e. adjusting the rate of flow in the product outlet line upwardly or downwardly by freeing or restricting product flow so that said rate of flow and said predetermined value are equal.

19. A method for calibrating an apparatus for injecting a liquid chemical product into a water supply line, in which the apparatus includes: a product tank; an injection pump having an inlet line connected to the product tank and an outlet line connected to the water supply line, the pump producing an outlet flow of the product which is substantially pulse free and at a substantially constant pressure; a continuously variable, electrically actuated, control valve, interposed in the product outlet line downstream from the injection pump, a product flow meter interposed in the product outlet line downstream from the control valve; a water supply line flow meter; and, a computerized controller, interconnected to the water flow meter, the control valve, and the product flow meter, the controller varying the control valve in response to outputs of the water flow meter and the product flow meter, comprising the steps of:
   a. selecting a target calibration of flow rate for the liquid chemical product;
   b. running the injection pump;
   c. adjusting the control valve until the actual flow rate measured by the product flow meter and the target flow rate are equal;
   d. stopping the injection pump;
   e. calculating an amount of time necessary for the injection pump to pump a target volume;
   f. diverting product from the inlet line to a calibration cylinder;
   g. filling the calibration cylinder with product until a calibration volume is reached;
   h. routing product from the calibration cylinder into the inlet line of the injection pump;
   i. running the injection pump for the calculated amount of time;
   j. subtracting a volume remaining in the calibration cylinder from the calibration volume to determine a pumped volume;
   k. comparing the pumped target volume to the target volume; and,
   l. adjusting the calibration of the flow meter so that the pumped volume and a corresponding volume measured by the meter are equal.

20. A method for calibrating an apparatus for injecting a liquid chemical product into a water supply line, in which the apparatus includes: a supply of liquid chemical product; a product injection pump having an inlet line connected to the supply of chemical product, and a product outlet line, the injection pump producing an outlet flow of the chemical product which is pulse free; a pressure regulating bypass valve interposed in the product outlet line, having an excess pressure bypass line interconnected to the inlet line; a continuously variable, electrically actuated, control valve, interposed in the product outlet line downstream from the bypass valve; a product flow meter interposed in the product outlet line downstream from the control valve, the product outlet line thereafter being fed into the water supply line at an injection point; a water supply line flow meter; and, a computerized controller, having an output connected to the control valve, a first input connected to the water supply line flow meter, and a second input connected to the product flow meter, the controller varying the control valve in response to an output of the main line flow meter and an output of the product flow meter, comprising the steps of:
   a. selecting a target calibration of flow rate for the liquid chemical product;
   b. running the injection pump;
   c. adjusting the control valve until the actual flow rate measured by the product flow meter and the target flow rate are equal;
   d. stopping the injection pump;
   e. calculating an amount of time necessary for the injection pump to pump a target volume;
   f. diverting product from the inlet line to a calibration cylinder;
   g. filling the calibration cylinder with product until a calibration volume is reached;

h. routing product from the calibration cylinder into the inlet line of the injection pump;

i. running the injection pump for the calculated amount of time;

j. subtracting a volume remaining in the calibration cylinder from the calibration volume to determine a pumped volume;

k. comparing the pumped target volume to the target volume; and, l. adjusting the calibration of the flow meter so that the pumped volume and a conrresponding volume measured by the meter are equal.

* * * * *